April 24, 1945.   W. H. C. BERG ET AL   2,374,267
ROLLER CHAIN
Filed March 31, 1944   2 Sheets-Sheet 1

Werner H. C. Berg
Victor A. Hanson
INVENTORS

BY
ATTORNEYS

April 24, 1945.   W. H. C. BERG ET AL   2,374,267
ROLLER CHAIN
Filed March 31, 1944   2 Sheets-Sheet 2
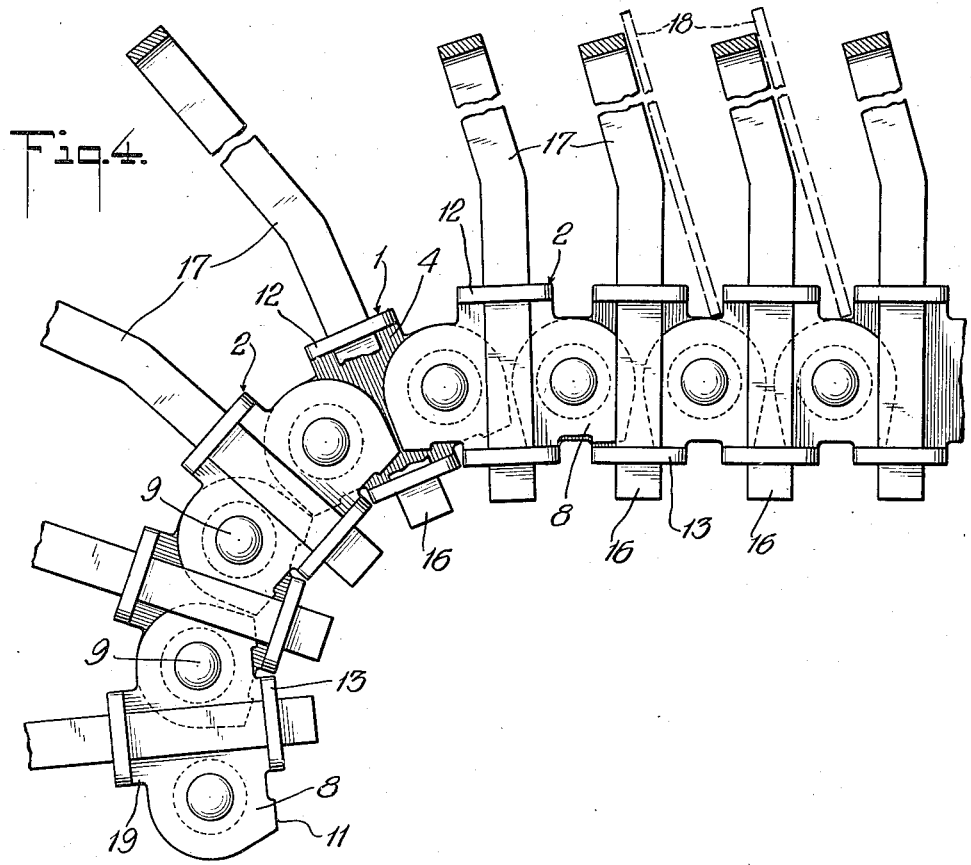
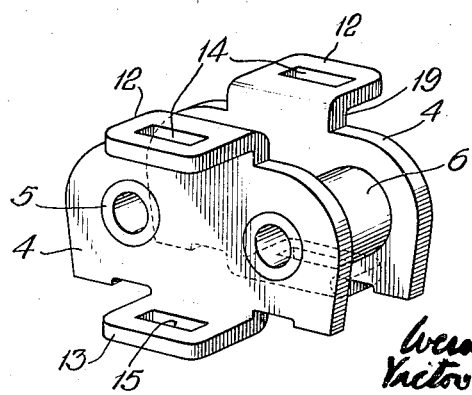

Patented Apr. 24, 1945

2,374,267

UNITED STATES PATENT OFFICE 2,374,267

ROLLER CHAIN

Werner H. C. Berg, Hartford, and Victor A. Hanson, East Granby, Conn., assignors to The Whitney Chain & Mfg. Co., Hartford, Conn., a corporation of Connecticut Application March 31, 1944, Serial No. 528,849

5 Claims. (Cl. 198—189)

The object of the invention is a roller chain capable of a wide variety of uses either for power transmission or conveyor purposes, and so constructed as to be susceptible of manufacture in large, medium or small pitches and at reasonable cost. Although by no means limited to such use, the chain is of particular utility in lithograph ovens, as a tin-plate sheet conveyor, where stability and a smooth feed with freedom from rocking or oscillation induced by undue motion of the links relatively to each other is of prime importance.

Figure 1:
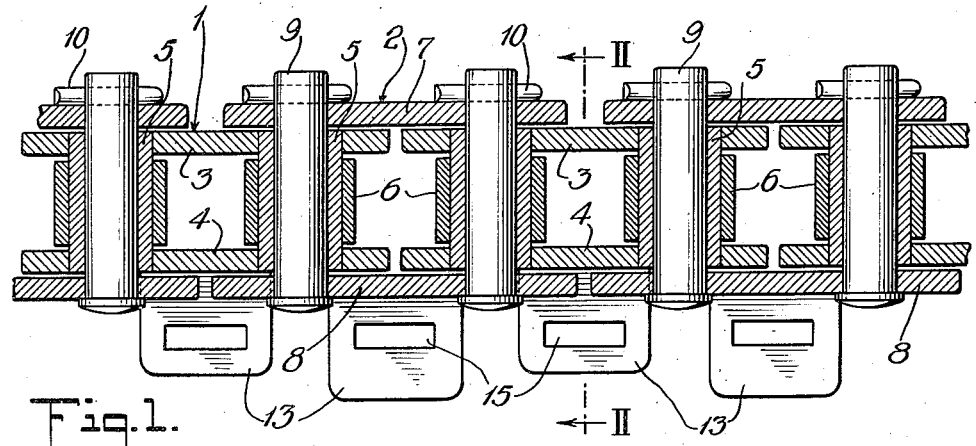
Figure 2:
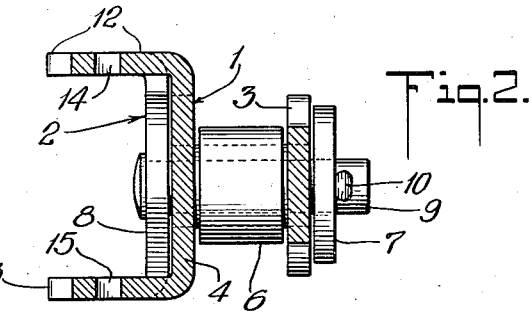
Figure 3:
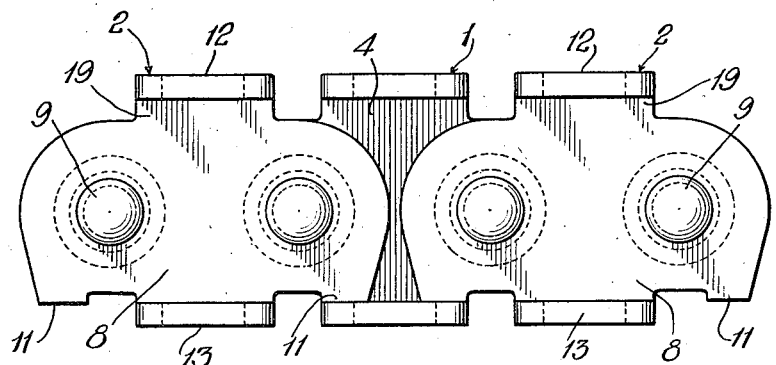

A preferred form of the invention is illustrated in the accompanying drawings of which Fig. 1 is a horizontal section of a stretch of the chain, Fig. 2 a vertical cross-section on the line II—II of Fig. 1, Fig. 3 an elevation of three of the links, Fig. 4 an elevation illustrating a particular application of the chain and Fig. 5 a perspective view of a modified form.

The chain comprises alternate roller links and pin links, generally designated 1 and 2, respectively. Each roller link consists of side plates, 3 and 4, united adjacent their ends and spaced by bushings 5 which carry rollers 6; and the pin links consist of side plates 7 and 8 located on and by the headed pins 9 passing through the pin holes located adjacent the ends of the links and locked in place as by cotter pins 10.

In this preferred form, which will be recognized as having special advantages from the standpoint of economy of manufacture and convenience of use, the corresponding side plates 4 and 8 of both types of link are of identical form. Each of said links is of oblong shape, with its upper corners rounded on a radius swung from the center of the adjacent pin hole, whereas the lower corners are angular and faced off flat, as at 11 (Figs. 3 and 5). The upper and lower edges of these plates are provided with centrally located flanges 12 and 13, which are parallel and extend outwardly away from the link at right angles to the plate. As appears in Fig. 3, the flat faces 11 are located in substantially the same plane as the upper faces of the lower flanges 13, so that when the links are assembled, the lower flat faces 11 of each pin link side plate 8 seat on the upper faces of flanges 13 of adjacent roller link side plate 4. On the other hand, the upper flanges are turned over from the upstanding neck portions 19 with the result that the lower faces of these flanges are above the adjacent upper edges of the plates.

The flanges 12 and 13 extend laterally a substantial distance and are provided with registering slots or perforations 14, 15 located wholly beyond the plane of the outer faces of the pin link side plates. As shown in Fig. 4, these slots thus serve to receive the legs or supporting members 16 of any suitable guides or separators 17 appropriately formed as dictated by the nature of the articles being conveyed on the chain, such as the lithograph plates diagrammatically indicated at 18. It will be seen from Fig. 4 that the upstanding neck portions 19 not only elevate the upper flanges to a height to provide adequate clearance for the links when rounding a drive sprocket but also with the adjacent upper edges of the links form shoulders for locating the lower edges of the articles such as plates 18. As will be understood, the chains are used in pairs with their flanges facing one another, the guides 17 having legs similar to those illustrated supported in the corresponding flanges of the companion chain and the articles on the conveyor, such as the plates 18, spanning the two chains.

By the link construction described, a highly efficient chain is provided being equally effective for transmission purposes as any standard roller chain and at the same time well adapted to the needs of a high load conveyor chain. It will be apparent that for the latter purpose the flanges can be supported on suitable rails, in which event the transported articles are conveyed smoothly, without rocking or jar, due to the stability imparted to the chain engagement of the faces 11 with the flanges 13 of adjacent links; and also that even when the flanges are not supported on rails, the interengagement of the faces 11 and flanges 13 precludes any back-bend in any upper stretch of chain so constructed.

In Fig. 5 is illustrated a modified form of link in which the side plates 4 on both sides of roller link are of the construction above described. As will be recognized, a chain constructed of links of this character has numerous applications and can be used either alone or as a center chain intermediate two chains of the kind first described, the three chains serving to convey two loads of the articles being handled. And, since the described link plate is symmetrical with respect to a center line normal to the longitudinal axis of the plate, such plate is adapted to be used on either or both sides of a link without change.

It will be understood that the references to the "upper" and "lower" portions of the plates are used in this description and in the claims for convenience of designation, having relation to the parts of the plates which correspond to such designations in the positions which the links occupy as in Fig. 3.

The following is claimed:

1. A roller chain side plate of oblong shape and of symmetrical form with respect to a center line normal to the longitudinal axis of the plate, said plate having a pin hole adjacent each end thereof, the upper corners of the plate being curved each on a radius swung from the centers of said holes and the lower corners of the plate being angular with flat faces on the lower edges of the plate adjacent such corners, a neck portion upstanding from the upper edge of the plate intermediate said holes and turned over to form a flange extending laterally of the plate with its lower face above the adjacent upper curved edges of the plate, and a second flange turned over from the lower edge of the plate intermediate said holes, the upper face of the second flange being substantially in the plane of the said flat faces, the length of said flanges, in a direction outwardly from the plate, being greater than the thickness of the plate.

2. A roller chain side plate of oblong shape and of symmetrical form with respect to a center line normal to the longitudinal axis of the plate, said plate having a pin hole adjacent each end thereof, the upper corners of the plate being curved each on a radius swung from the centers of said holes, a neck portion upstanding from the upper edge of the plate intermediate said holes and turned over to form a flange extending laterally of the plate with its lower face above the adjacent upper curved edges of the plate, and a second flange turned over from the lower edge of the plate intermediate said holes, the upper face of the second flange being substantially in the plane of the lowest faces of the lower edge of the plate, the length of said flanges, in a direction outwardly from the plate, being greater than the thickness of the plate.

3. A roller chain composed of alternating roller links and pin links including identical roller link and pin link plates on at least one side of the chain, each of said identical links having load-supporting means consisting of two centrally located, laterally projecting, parallel flanges extending outwardly of the link one from the upper and one from the lower edge thereof, the upper faces of the flanges at the lower edges of all links being in the same plane as the lower edges of the end portions of the plates and the lower faces of the upper flanges being above the upper edges of the end portions of the plates, the lower flange of each roller link plate being overlapped by and serving as a support for the lower edges of the end portions of the adjacent pin link plates, and said upper and lower flanges having registering perforations therein located outside of the plane of the outer faces of the pin link plates.

4. A roller chain composed of alternating roller links and pin links including a continuous series of load-supporting roller link and pin link plates on at least one side of the chain, each of said plates having load-supporting means consisting of two centrally located, laterally projecting parallel flanges extending outwardly of the link one from the upper and one from the lower edge thereof, the upper faces of the flanges at the lower edges of the roller link plates being in the same plane as and overlapped by the lower edges of the end portions of the adjacent pin link plates, and said upper and lower flanges having registering perforations therein located outside of the plane of the outer faces of the pin link plates.

5. A roller chain composed of alternating roller links and pin links including identical roller link and pin link plates on at least one side of the chain, each of said identical links having load-supporting means consisting of two centrally located, laterally projecting, parallel flanges extending outwardly of the link one from the upper and one from the lower edge thereof, the upper faces of the flanges at the lower edges of all links being in the same plane as and overlapped by the lower edges of the end portions of the adjacent link plates.

WERNER H. C. BERG.
VICTOR A. HANSON.